UNITED STATES PATENT OFFICE.

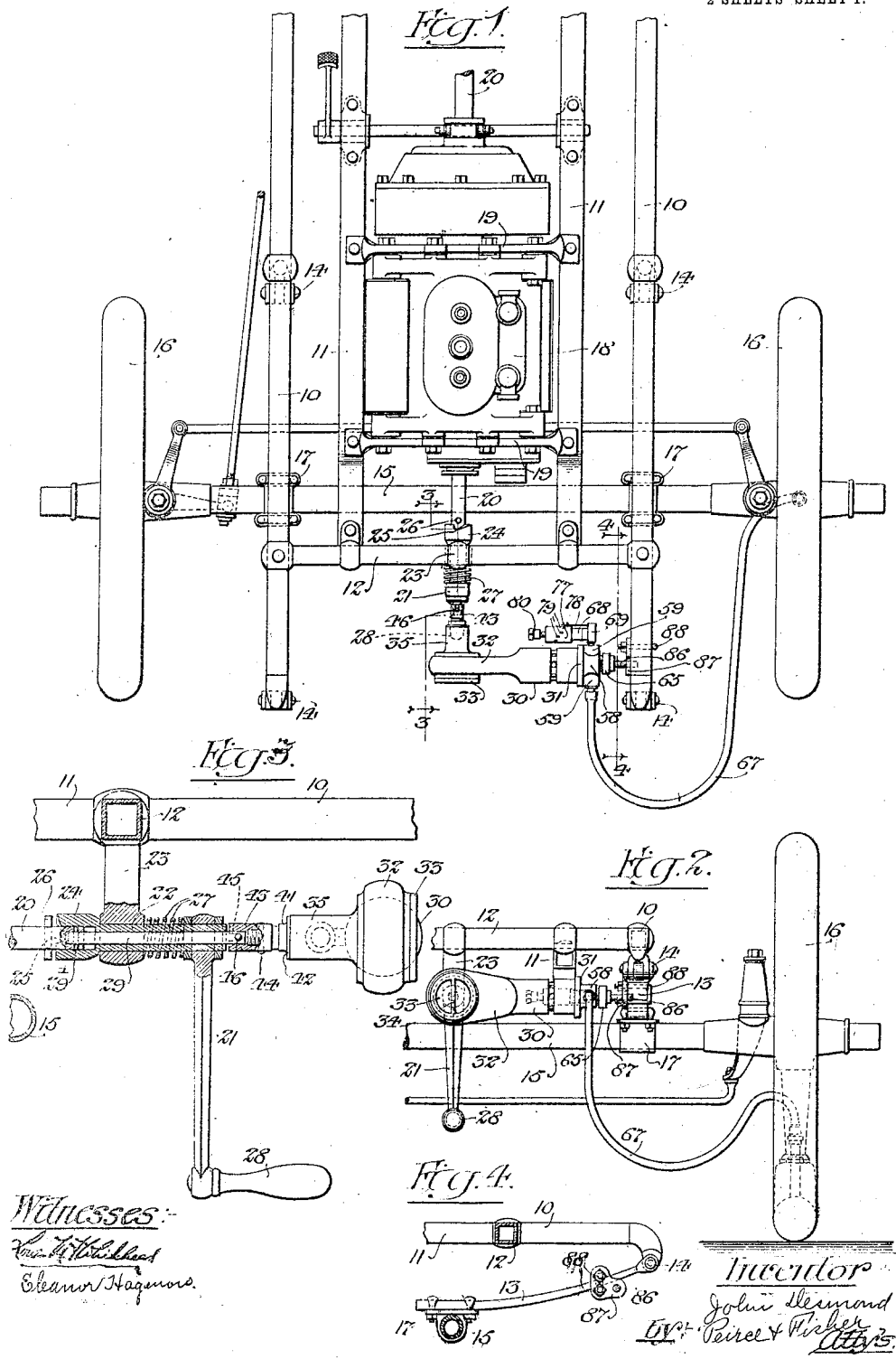

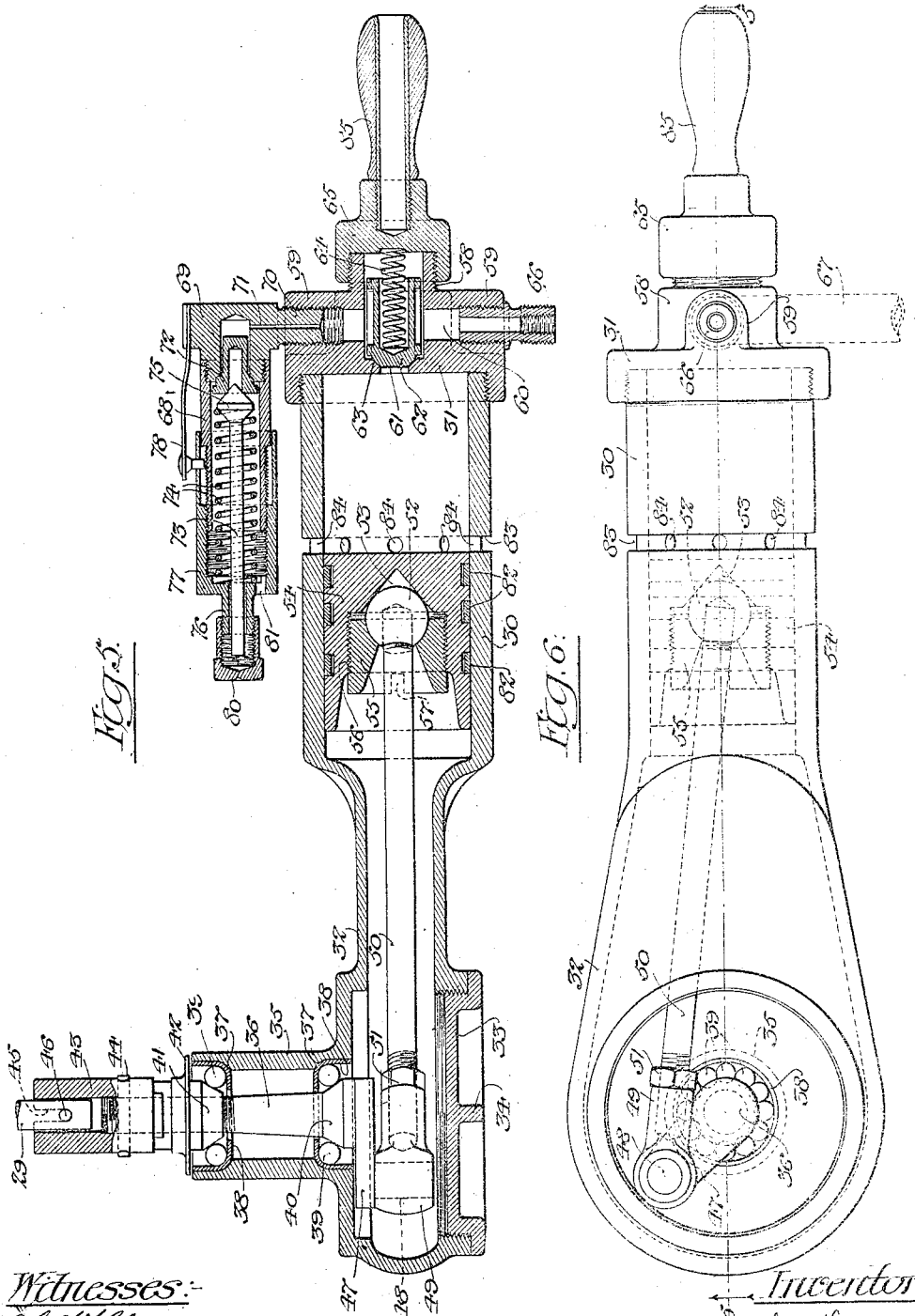

JOHN DESMOND, OF CHICAGO, ILLINOIS, ASSIGNOR, BY MESNE ASSIGNMENTS, TO WILLIAM S. POTWIN, OF CHICAGO, ILLINOIS.

AIR-PUMP FOR INFLATING AUTOMOBILE-TIRES.

1,051,090.  Specification of Letters Patent.  Patented Jan. 21, 1913.

Application filed January 20, 1909. Serial No. 473,323.

*To all whom it may concern:*

Be it known that I, JOHN DESMOND, a citizen of the United States, and a resident of Chicago, county of Cook, and State of Illinois, have invented certain new and useful Improvements in Air-Pumps for Inflating Automobile-Tires, of which the following is a specification.

The invention relates to air pumps for inflating the tires of automobiles and seeks to provide a simple and effective construction which can be readily and conveniently connected to the engines of automobiles such as are now in common use and driven thereby to inflate the tires of the machine.

With this and other objects in view, the invention consists in the features of construction, combinations and arrangements of parts hereinafter set forth, illustrated in the accompanying drawings and more particularly pointed out in the appended claims.

In the drawings, Figure 1 is a plan view of the front portion of the frame of an automobile showing the improved air pump applied in position thereon; Fig. 2 is a partial front view of the same; Fig. 3 is a detail section on the line 3—3 of Fig. 1; Fig. 4 is a detail section on the line 4—4 of Fig. 1; Fig. 5 is a view in central longitudinal section of the improved pump; Fig. 6 is a view in elevation thereof with the crank case cover removed.

The automobile frame illustrated is of common type and comprises outer and inner side-bars 10 and 11 connected by a cross-bar 12. Springs 13 are pivotally connected at their front and rear ends by suitable couplings 14 to the outer side-bars 10. The front axle 15 that carries the wheels 16 is secured to the springs 13 by couplings 17. As usual in the common type of automobiles driven by internal combustion engines, the engine or motor is mounted upon the forward part of the frame with its crank or engine shaft extending longitudinally thereof. In the form illustrated, the engine 18 is mounted between a pair of supports 19 that rest upon and are secured to the inner side-bars 11. The rear end of the engine shaft is connected to the rear drive axle of the machine while its forward end is provided with a starting crank 21. The starting crank illustrated is of common form and is secured as illustrated to the forward end of a coupling piece or shaft 22 that is journaled in a bracket 23 depending from the front cross-bar 12 of the machine. At its inner end, it is provided with an enlarged, hollow head 24 which fits over the forward end of the engine shaft 20. The head or coupling member 24 is provided with notches 25 that are arranged to engage the end of a cross-pin 26 extending through the shaft. The starting crank 21 is normally disconnected from the engine with the coupling member 24 out of engagement with the pin 26. The parts are held in this disconnected or disengaged position by a spring 27 coiled about the part 22 and interposed between the bracket 23 and the hub of the crank 21. The end of the crank is provided with a suitable handle 28 and, in starting the engine, the crank and parts connected thereto are first pressed inwardly against the pressure of the spring 27 to bring the notches 25 of the coupling member into engagement with the pin 26; the crank is then turned to start the engine. When released, the spring 27 automatically restores the starting crank to its disengaged or disconnected position.

The improved pump is adapted to be connected to the forward end of the engine shaft and, for this purpose, the engine shaft is provided with an extension projecting through the part 22 of the starting device. This extension is preferably in the form of a short shaft section 29 that may be readily applied to automobiles now in use by forming a hole through the shaft 22 of the starting device and in the outer end of the engine shaft in which the extension 29 is inserted. The shaft section 29 is secured in position and permanently united to the engine shaft 20 by a cross-pin 29' extending through the latter. The forward end of the shaft extension projects beyond the hub of the starting crank 21 and is adapted to detachably engage the drive shaft of the improved pump, as hereinafter set forth.

The pump comprises a cylinder 30 closed at one end by a cap or head 31 screw threaded thereon. A support extends from the opposite end of the pump cylinder that is preferably in the form of a casing 32 for inclosing the drive crank and pitman rod that operates the pump piston. The crank casing is provided on one side with a circular opening within which is threaded a flanged cover-plate 33. For convenience in removing this cover-plate, it is provided with a rib 34. The opposite side of the crank casing is provided with an integral, cylindrical projection 35 within which the crank shaft 36 of the pump is journaled. In the form illustrated, the cylindrical projection 35 is provided at its inner and outer ends with seats 37, which receive a pair of retainer rings 38 within which are arranged rows of anti-friction balls 39. A cone 40 formed upon the inner end of the crank-shaft 36 engages the inner row of balls 39 and an adjusting cone 41 threaded upon the outer end of the shaft engages the outer row of balls as shown. A flange 42 upon the outer cone 41 acts as a guard to prevent the entrance of dirt and dust to the bearings.

A coupling sleeve 43 is threaded upon the outer, projecting end of the crank-shaft 36 and is securely fixed thereto by a cross-pin 44. This coupling sleeve is adapted to detachably interlock with the projecting end of the engine shaft extension 29 and for this purpose is preferably adapted to fit over the end of the shaft extension 29 and is provided with longitudinally extending slots 45 adapted to receive the ends of a cross-pin 46 upon the end of the shaft extension 29.

The inner end of the crank-shaft 36 is provided with a crank 47 having a wrist or crank pin 48 that is engaged by a head 49 screw threaded upon the outer end of a pitman rod 50. A lock nut 51 threaded upon the end of the pitman rod engages the inner end of the head 49 as shown. The inner end of the pitman rod is screw threaded into a sphere or ball 52 that engages a conical seat 53 in the back of a piston 54. An annular retainer 55 threaded into a socket 56 in the piston engages the ball 51 and thereby connects the pitman rod to the piston. The annular retainer or nut 55 is provided with notches 57 in its outer edge as indicated, to receive a spanner wrench.

The head or cap 31 is provided on its outer face with a central enlargement or boss 58 and with lateral projecting bosses 59, all of which are cored out to form a discharge passage 60 that communicates with the interior of the pump cylinder 30 through a discharge port 61. A cup-shaped valve 62 is guided within the central bore of the boss 58 and is arranged to engage a valve seat 63 about the discharge port 61. The valve 62 is yieldingly held to its seat by a spring 64 arranged within the same and bearing at its outer end upon a thimble 65 that is screw threaded to the outer, reduced end of the central boss or projection 58. A nipple 66 screw threaded into one of the lateral enlargements 59 is connected to the end of a coupling pipe 67 by which the pump is connected to the nipple of any of the tires of the automobile.

In the preferred form illustrated, a relief valve is mounted upon the other lateral enlargement 59. The relief valve casing comprises a cylindrical section 68 which is threaded upon an elbow section 69. The latter is provided with a nipple 70 screw threaded into the lateral enlargement 59 upon the cap 31 of the pump cylinder and this nipple is provided with a reduced relief port or passage 71 communicating with the discharge passage 60 of the pump. The relief valve 72 is arranged upon a suitable seat in the casing section 69 and is yieldingly held to its seat by a valve stem 73 and spring 74. The valve stem is provided at its inner end with a conical head which engages the valve 72 as shown. The outer end of the valve stem extends through a guide 76 in the outer end of a sleeve 77 that is adjustably threaded upon the cylindrical section 68 of the valve casing. The spring 74 is coiled about the stem 73 and extends between the head thereof and the sleeve 77. By adjusting the latter, the tension of the spring may be adjusted so that the air compressed by the pump will escape therethrough when the desired pressure is attained in the tire. A spring-catch 78 is arranged to engage any one of a series of holes 79 in the sleeve 77 and hold it in adjusted position. The spring-catch is secured, as shown, to the valve casing section 69. The relief valve may be thrown out of operation by a thimble 80 screw threaded upon the outer end of the guide 76. By screwing the thimble down upon the guide 76 against the end of the valve-stem 73, the relief valve 72 may be held to its seat. It is frequently desirable to do this if the passages to the tire are choked up in any way, since otherwise the relief valve would be lifted from its seat to permit the escape of air before the desired pressure of the tire is attained. When this is done the tire should first be pumped up and then the relief valve released by unscrewing the thimble 80 so that the air in excess of the tire can escape through the coupling pipe 67, discharge passage 60 and relief valve 72. As shown, the end of the adjusting sleeve 77 is provided with discharge ports 81 to permit the escapement of air.

The pump piston 54 in its preferred form is longer than its stroke and is provided with suitable packing rings 82 as shown. The cylinder 31 is provided in the side wall intermediate its ends with a reduced portion 83 that is provided with a circular series of inlet ports 84. These ports are uncovered by the piston 54 at the end of its out stroke as shown, and the air will rush through the ports into the vacuum created upon the out stroke of the piston. On the in stroke of the piston, the air in the cylinder is compressed past the discharge valve 62 and through the discharge passage 60 and coupling pipe 67 into the tire. It will be seen, that by means of the detachably interlocking coupling members upon the projecting ends of the pump shaft 36 and engine shaft extension 29, the pump can be easily and readily connected to the engine of the automobile and driven thereby to inflate the tires.

If desired, the pump may be provided with a handle 85 that is detachably threaded to a socket in the thimble 65, as shown in Figs. 5 and 6. By means of this handle the pump is conveniently held in position upon the engine shaft to be driven thereby. Preferably, however, a rod 86, as shown in Figs. 1, 2 and 4, is screw threaded into the socket in the thimble 65 and this rod is arranged to detachably engage an opening in a supporting bracket or plate 87 that is secured in position upon the automobile frame. In the form shown, this support is secured to one of the front side springs 13 by a U-bolt 88. By this means, the pump can be readily supported in position by first inserting the rod 86 through the hole in the supporting plate 87 and then engaging the interlocking coupling members on the shafts 29 and 36. The coupling pipe 67 can then be connected to the tires of the machine, one after another, and the tires pumped up. As soon as the work is done the pump can be readily disengaged from the machine.

It should be noted that the pump in no way interferes with the proper operation of the engine or its starting crank and can be readily and conveniently applied to automobiles now in use.

It is obvious that numerous changes may be made from the details set forth without departure from the essentials of the invention.

I claim as my invention:—

1. The combination with an automobile and engine therefor, of a starting crank for the engine, a shaft permanently connected to the engine and projecting through the hub of said starting crank and an air pump adapted to detachably engage the projecting end of said shaft, substantially as described.

2. The combination with an automobile and an engine therefor, of a starting crank, a coupling sleeve normally disconnected from the engine whereon said crank is mounted, a shaft permanently connected to the engine, extending through said coupling sleeve and projecting therefrom, and an air pump having a crank shaft adapted to be detachably coupled to the projecting end of said first mentioned shaft, substantially as described.

3. The combination with an automobile, engine therefor, and engine shaft, of starting device, a coupling sleeve therefor normally disconnected from said engine shaft, said shaft having an extension extending through and projecting from said coupling sleeve, and an air pump comprising a cylinder, a crank shaft journaled in bearings connected to said cylinder, and a piston in said cylinder connected to said crank shaft, said crank shaft and the projecting end of said engine shaft extension having detachably interlocking coupling members, substantially as described.

4. The combination with an automobile, an engine therefor and engine shaft, of a starting crank, a coupling sleeve journaled in the frame of the automobile and normally disconnected from said engine shaft, said shaft having an extension fixed thereto and projecting through said coupling sleeve, and an air pump comprising a crank casing and cylinder, a crank shaft journaled in said casing and projecting therefrom, and a piston in said cylinder connected to said crank shaft, the projecting ends of said crank shaft and of said engine shaft extension having detachably interlocking coupling members, substantially as described.

5. The combination with an automobile, an engine therefor and a shaft driven by the engine, of a detachable pump casing having a cylinder at one end, a piston in said cylinder, an operating crank shaft journaled in the opposite end of said casing and connected to said piston, said pump shaft and said engine shaft having projecting end portions provided with detachably interlocking coupling parts and a support fixed to a part of the automobile and having an opening therein, said pump having a projecting part at its cylinder end arranged to loosely extend within the opening of said support when said coupling parts are engaged, whereby the pump is removably held in operative position by said coupling parts and said support, substantially as described.

JOHN DESMOND.

Witnesses:
 CLARA A. NORTON,
 KATHARINE GERLACH.